Tool for fitting Castors to Furniture
A. Wippo, Invr.

72436

PATENTED DEC 17 1867

Witnesses:
W. E. Mans
L. L. Coburn

Inventor:
Albert Wipp

United States Patent Office.

ALBERT WIPPO, OF CHICAGO, ILLINOIS.

Letters Patent No. 72,436, dated December 17, 1867.

IMPROVEMENT IN BORING-TOOLS.

*The Schedule referred to in these Letters Patent and making part of the same.*

TO ALL WHOM IT MAY CONCERN:

Be it known that I, ALBERT WIPPO, of Chicago, in the county of Cook, and State of Illinois, have invented a new and useful Tool for Fitting Casters to Furniture; and I do hereby declare and make known that the following is a full, clear, and exact description of the same, reference being had to the accompanying drawings, and the figures and letters marked thereon, which form part of this specification.

My said invention relates to a device for trimming off and forming into the proper shape the legs or supports of furniture, so that casters can readily be applied and secured thereto, having reference to that kind of casters which are provided with a socket to receive the end of the leg or support, and not to that kind which enter into a recess in the end of the leg, as hereinafter more fully set forth; said tool being composed of cutters, a bit to bore the hole to receive the shank of the caster, and a suitable stock, to which said parts are attached, and by means of which they are operated, as hereinafter described.

To enable those skilled in the art to understand how to make and use my invention, I will proceed to describe the same with particularity, making reference, in so doing, to the aforesaid drawings, in which—

Similar letters of reference in the several figures denote the same parts of my invention.

Figure 1:
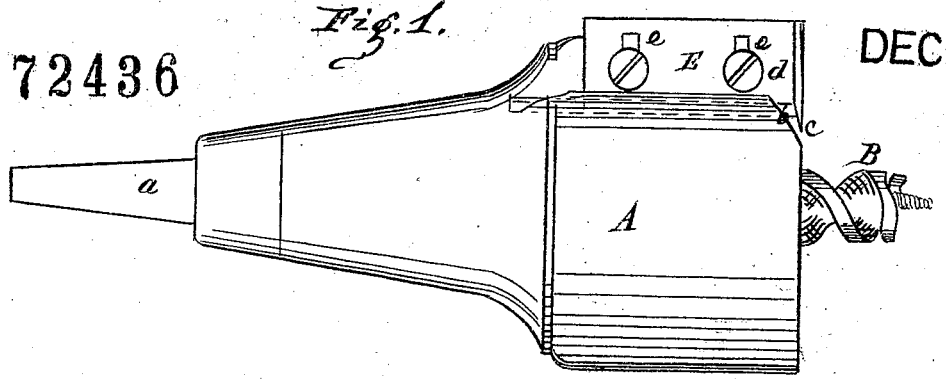
Figure 1 represents a side view of my said invention.
Figure 2:
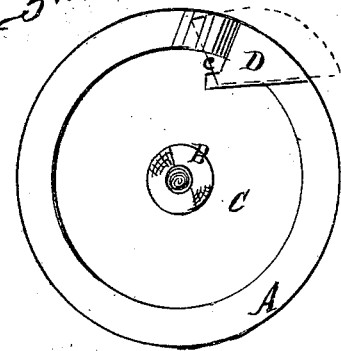
Figure 2 is an end view thereof, the cutter being shown in dotted lines.
Figure 3:
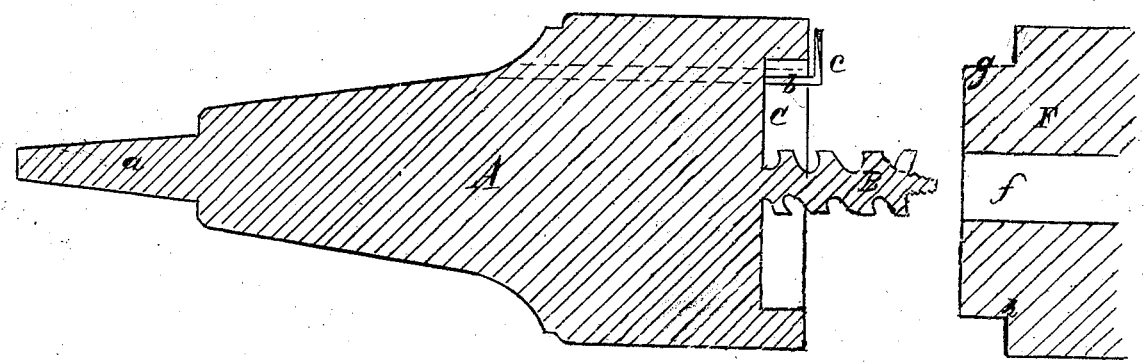
Figure 3 is a longitudinal central section of the same.

A represents the stock to which the parts hereinafter described are attached, being provided with a shank, $a$, which is fitted in the shaft or other device, whereby said stock A may be revolved as desired. In the end of said stock A, a circular cavity, C, is provided, of a depth equal to the length of fitting upon the leg of the furniture, and of a diameter sufficient to admit the end of the leg to be trimmed. There is an angular slot or recess in the perimeter, marked D, as seen in fig. 2, in which the knife E is secured by means of screws $d$ passing through slots $e$ $e$ in the said knife, so as to permit the adjustment of the knife in or out, as may be desired. The edge of the knife is in form a right angle, the cutter $c$ forming the shoulder $h$, and the cutter $b$ cutting down the furniture-leg to the required size, as indicated at $g$, in fig. 3. At the centre of said stock A, in a line with its axis, a bit, B, projects, as shown, which may be permanently fastened in or to the stock A, or may be removably secured thereto, as may be preferred. The object of this bit is to bore the hole $f$ in the foot of the support to receive the shank of the caster.

I am aware that tools have been constructed to bore out the recess in the ends of piano-legs, and such tool I do not claim; but What I do claim, and desire to secure by Letters Patent, is—

The above-described tool for shaping the ends of the legs of furniture, constructed to operate substantially in the manner and for the purpose set forth.

ALBERT WIPPO.

Witnesses:
 W. E. MARRS,
 L. L. COBURN.